Oct. 9, 1928.
W. BENSIEN
CULTIVATOR
Filed April 8, 1927
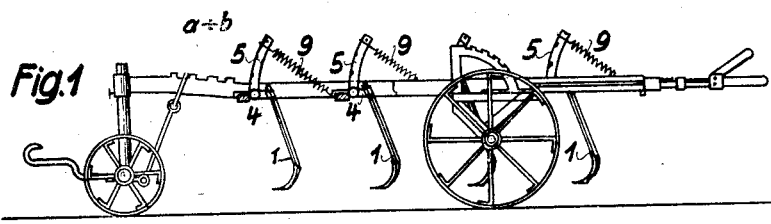
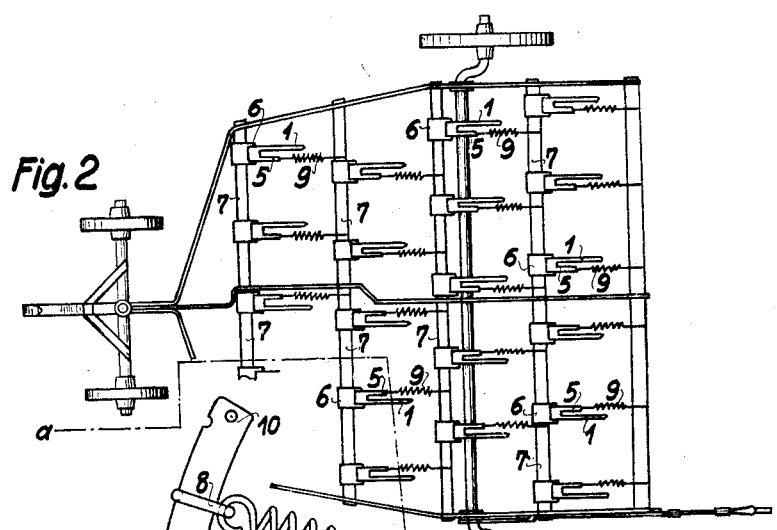
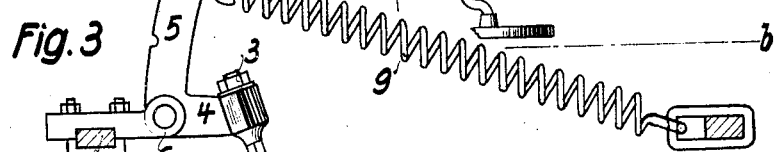
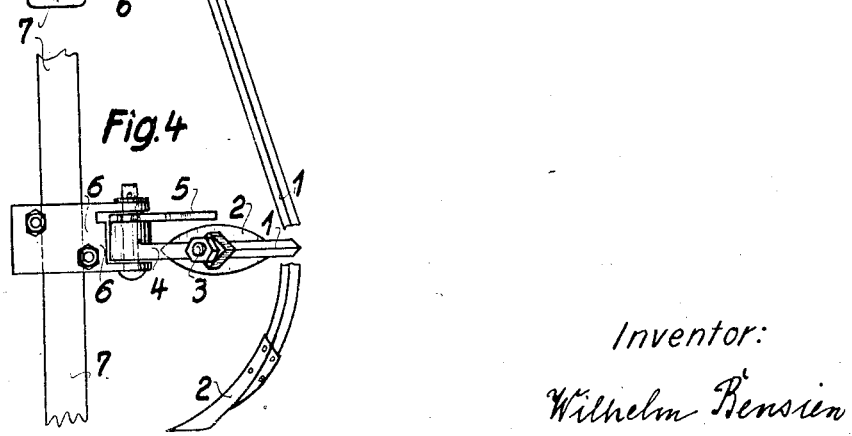
Inventor:
Wilhelm Bensien Patented Oct. 9, 1928.

1,687,422

UNITED STATES PATENT OFFICE.

WILHELM BENSIEN, OF SIBSTIN, GERMANY.

CULTIVATOR.

Application filed April 8, 1927, Serial No. 182,037, and in Germany August 30, 1926.

This invention relates to a cultivator of the kind provided with spring-controlled tines for weeding purposes and the like and its object is to provide means whereby the spring action can be conveniently regulated to suit different kinds of soil without altering the tension of the springs themselves. With this object in view, the invention consists in connecting each tine to a pivoted bell crank having a long arm which is acted upon by a spring for holding the tine against the ground, said arm being curved about the fixed connecting point of the spring and provided with notches for engaging the spring at different distances from the fulcrum. The spring action on the tine can thus be regulated by varying the leverage, the tension of the spring remaining substantially constant.

Fig. 1 of the accompanying drawings represents a side view of the machine,

Fig. 2, a plan of the same,

Fig. 3, a side view of the tine arrangement on an enlarged scale, and

Fig. 4, a plan view of the tine arrangement including a side view of the lower end of the tine.

The machine consists of a wheeled horizontal frame having a plurality of cross-bars 7 on which brackets 6 are adjustably arranged. Pivoted to each bracket is a bell-crank having a short, substantially horizontal arm 4 and a long, substantially upright arm 5. A tine 1 having at its lower end an exchangeable share 2, is secured by means of a screw 3 to the arm 4. The tine is held against the ground by a spring 9 which is connected at one end to the arm 5, the other end being connected either to the adjacent bar 7 or to a separate rigid support in the machine frame. The spring 9 is connected to the arm 5 by means of a ring 8 which can be adjusted to different positions for varying the leverage with which the spring acts on the bell-crank. The arm 5 is curved about a point which is substantially coincident with the fixed connecting point of the spring 9 when the arm occupies its normal or idle position. In this manner the tension of the spring will remain substantially constant in the different spring positions, and the springs will be practically relieved of tension when the tines are idle irrespective of their positions on the arms 5.

I claim:

A cultivator comprising a wheeled horizontal frame, bell-cranks mounted pivotally in said frame, a tine secured to one arm of each bell-crank, and a spring supported at one end in the frame and acting on the other arm of the bell-crank so as to hold the tine against the ground, the connection between said spring and its bell-crank arm being adjustable for varying the leverage, said latter arm being curved about the supporting point of the spring in the frame to render the spring tension equal in different positions of adjustment.

WILHELM BENSIEN.